Patented Sept. 27, 1949

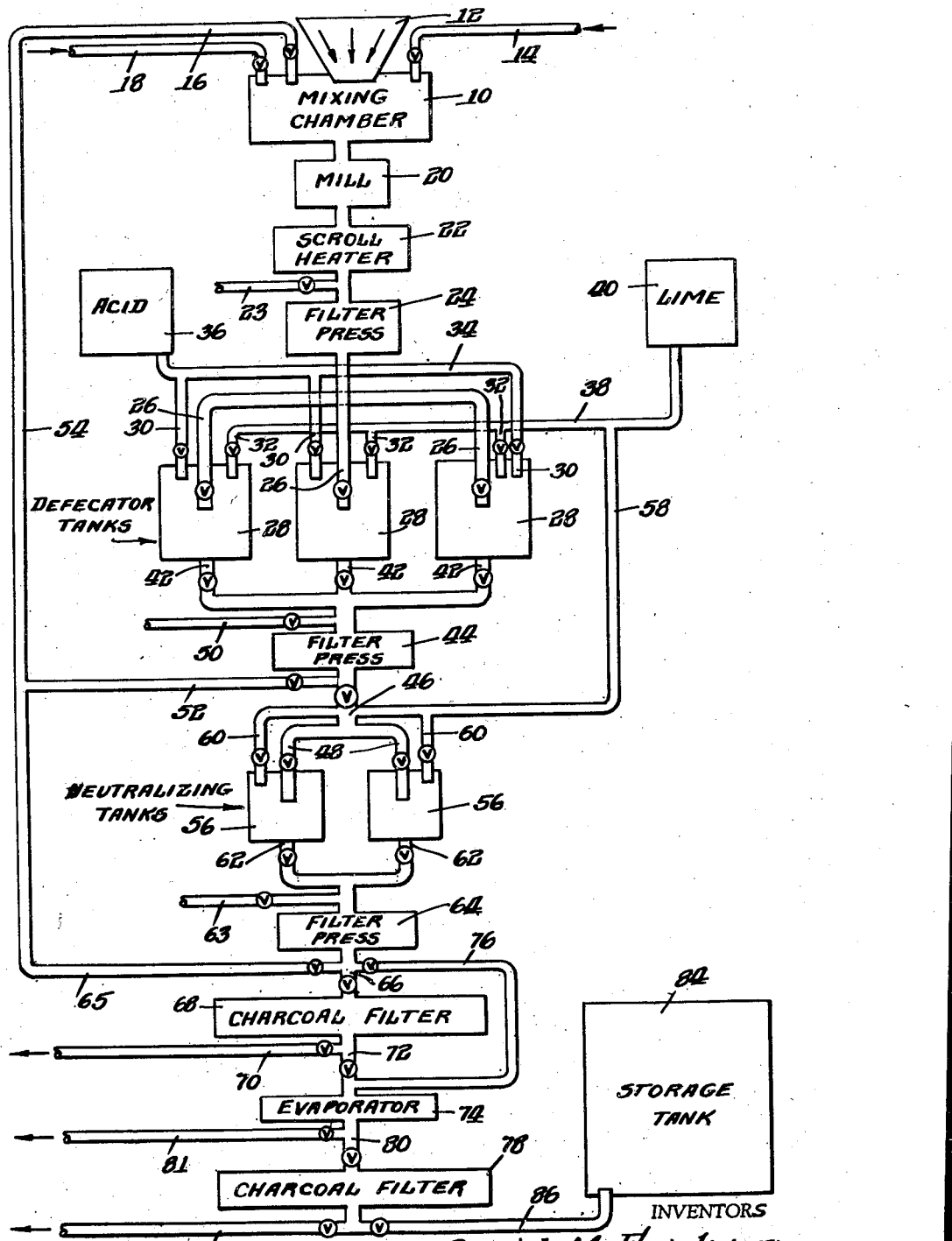

2,482,750

UNITED STATES PATENT OFFICE 2,482,750

EXTRACTION AND PURIFICATION OF SUGAR

Arvid M. Erickson, San Jose, and John D. Ryan, Campbell, Calif., assignors to Barron-Gray Packing Company, San Jose, Calif., a corporation of California Application October 1, 1941, Serial No. 413,164

8 Claims. (Cl. 127—44)

This invention relates to the preparation of an improved sweetening medium. More particularly, it is concerned with improved methods for extracting sweetening media from materials in which they occur naturally and especially with the extraction of a sweetening medium from fruits, including particularly fruit wastes.

Although the pressing need for a satisfactory method of recovering in useful form the very considerable sugar content of the enormous quantity of fruit waste which is annually discarded has long been appreciated, no practical commercial method has heretofore been devised for producing a real sweetening medium from fruit. The processes previously proposed involve difficult filtration steps and yield products with little or no sweetening power.

Throughout this specification or in the appended claims whenever reference is made to "sugars purity" or to "sugars having a purity" or in any other way to purity of sugar in solution, the purity referred to is in terms of the quantity of sugars as related to the total solid materials in solution with the sugars in a common solvent.

The term "sweetening medium" as used herein means just what the name signifies, i. e., it is a sugar containing medium which is substantially free of materials which detract from the sweetening power of the sugars present such as acids and ash forming materials although it may contain substantial quantities of inert diluents.

It is, therefore, an object of this invention to provide an improved method for preparing a sweetening medium from fruit including particularly fruit wastes.

Another object is to provide a method for extracting a sugar containing liquid from fruit and especially from fruit wastes and for purifying this liquid to form a sweetening medium which is free of the characteristic odor and flavor of the fruit from which it is derived.

A further object is to provide an improved sweetening medium derived from fruit.

Other objects will appear hereinafter.

It has now been found that the foregoing objects may be accomplished by treating the sugar-bearing juice from fruit in any form, and particularly in the form of fruit wastes, with certain divalent alkaline materials and certain acids which are added in such a manner and at such times that the pH of the material undergoing treatment is kept within proper limits, the exact limits depending upon the source of the juice and the treatment to which the material has previously been subjected, all as hereinafter more fully described. Whatever the previous treatment, however, the material is ultimately brought to a pH on the acid side of neutrality, lying preferably between about pH 4 and about pH 6, and then filtered. The process is particularly adapted to the preparation of sweetening media from fruit, especially the waste portion thereof, which sweetening media include as their principal sweetening ingredients the sugars which occur naturally in fruit, but it is also applicable to the treatment of fruit in any form in admixture with other sugar-bearing materials, such as sugar-cane, sugar-beets, sorghum, and the like.

The reactions between the reagents (added as described above) and the impurities present are not reversible so that both the acid and alkaline materials may be added without an intermediate filtration. Thus, for example, if the alkaline material is added to a definite pH and the acid is thereafter added without an intermediate filtration step, the impurities with which the alkaline material has reacted are not freed but are precipitated out of the solution in the precipitate formed by the addition of the acid along with still other impurities. Filtration only after the addition of both the acid and alkaline materials is decidedly advantageous not only from the cost standpoint but also because it aids in preserving the sugars, particularly in the case when the liquid is treated with alkaline material to a high pH.

The sugar bearing juice, even after the precipitation of impurities by addition of acidic and alkaline reagents, as described above, may and usually does still contain additional quantities of undesired impurities. Accordingly, it is preferably given still further treatments, as described hereinafter, to complete the elimination of the undesired impurities. While this further treatment may precede filtration, it is preferred that such further purification treatment be applied to the filtrate resulting from the filtering step described above, which filtrate contains the sugars or sweetening ingredients of the fruit.

For example, where an ash-forming alkaline material is added to the sugar bearing fruit juice to eliminate impurities as described above, some of this alkaline material will ordinarily remain in the filtrate. The presence of this alkaline material in substantial quantities will give the product an undesirable taste and the alkaline material usually precipitates out on standing to give the product an undesirable cloudy appearance. Surprisingly, it has been found that any substantial quantity of such alkaline material may be eliminated by adding more alkaline material until the pH is materially increased from that at which the filtration took place. The exact pH to which the liquid should be so raised varies with different filtrates as indicated hereinafter. The addition of more alkaline material which is preferably the same as that to be eliminated causes any substantial quantity of the alkaline material present to be precipitated out and upon filtration a liquid is obtained which is substantially free of materials which detract from the sweetening power of the sweetening ingredients present, including both acids and ash forming materials.

In accordance with the preferred form of the invention, raw fruit, such as peaches, pears, apples, grapes, and the like, or dried fruit, such as raisins and prunes, or the wastes from fruit packs, such as the wastes from packing peaches or the waste from packing mixed fruit, known as fruit salad or fruit cocktail, or other fruit wastes, or mixtures of two or more of the foregoing, are ground to a fine pulp in a suitable pulper, of which a number are available, and sugar-bearing liquid is then extracted from this pulp. Rapid and complete extraction of sugar-bearing liquid from such pulp cannot be accomplished without the aid of added materials. The pulp is generally non-fibrous and does not readily release the sugar-bearing liquid even when thinned somewhat with water and subjected to substantial pressures. It has been found, however, that by adding, as a leaching agent, a small amount of water, on the order of about ten per cent by weight, based on the weight of fruit with normal water content, and much more in the case of dried fruit, and/or by adding to the pulp, in addition to the water, a small amount of an alkaline material, such as an alkaline earth metal oxide or hydroxide, preferably in the form of an aqueous solution or dispersion, and preferably calcium oxide or lime, and/or by adding a fibrous material, such as straw, or preferably a sugar-bearing fibrous material, such as sorghum, sugar-cane, beets, et cetera, a sugar-bearing juice can be caused to flow from the pulp quite freely when the pulp is pressed in a filter press, centrifuged or otherwise subjected to pressure to free the juice, and that a substantially complete extraction of sugar in the form of this juice can be effected in the filter press or other juice extracting apparatus. In some cases the extraction of the juice is improved if the pulp mixture is heated somewhat after cracking and prior to the pressing, centrifuging or other extraction operation.

The water added to the pulp originally may be either relatively pure water or water containing materials which are not undesirable, particularly water derived from other points in the system such as, for example, the "sweet water" from washing certain precipitates, which is hereinafter described. Water is preferably added in about the amount which will insure the complete leaching out of the sugar. The amount of water used even with fruit material of normal water content may, however, be varied considerably from ten per cent within the scope of the invention, depending upon the material treated, as well as upon other considerations and in the case of fruits of abnormal water content, the amount preferably added varies widely. Thus, in the case of raisins, for example, preferably an amount of water of the order of 300 per cent by weight of the raisins is added although both greater and lesser quantities may be used. It will be apparent, however, that the presence of excessively large quantities of water in any case increases the quantity of juice which must be handled and that, on the other hand, the presence of very small quantities of water may result in a pulp mixture which is too thick so that, for example, it does not heat readily and in addition involves the danger that a substantial portion of the sugar will remain with the pulp and will not be extracted. The preferred quantity of water is the minimum quantity capable of extracting substantially all the sugar from the material being treated. On the other hand, although water is generally added, its addition is not absolutely necessary. For example, if the fruit contains large quantities of water and/or if the alkaline reagent is added to the pulp in very dilute form so that sufficient water for extraction is present, the addition of water as such may be omitted. It is preferable to add any water which is to be used either during or just prior to the grinding of the fruit. Among other things, the presence of the water facilitates grinding and assists in avoiding air oxidation. As is well known, fruit exposed to air after the skin is broken rapidly oxidizes and turns brown, whereas if it is mixed with or covered with water, this does not occur.

It has been found that in general a given pulp will have an optimum pH on the alkaline side, at which a maximum of juice may be extracted without substantial loss due to saccharation and without substantial darkening of the juice. At this optimum pH the pH of the juice expressed by the pulp is usually, but not necessarily, on the alkaline side also. Where the pH of the expressed juice is appreciably in excess of 9 it has further been found that substantial reaction of sugar with lime to form insoluble saccharates takes place and under these conditions substantial quantities of the sugar are left behind in the pulp in the form of insoluble compounds. Where the pH of the extracted juice does not exceed 9, however, little or no sugar is left behind, although substantial quantities of impurities are precipitated and left in the pulp. Thus, the optimum pH of the pulp, referred to above, will at least be low enough so that the pH of the expressed juice is not greater than about 9.

Particular attention is called to the fact that, so far as saccharation is concerned, it is the pH of the expressed juice which is important and not that of the pulp. While there is a relation between the pH of the pulp and that of the juice expressed from it in a given case, the pH of the pulp prior to pressing is usually substantially higher than that of the juice expressed from it. This is believed to be due to the fact that in the pulp mixture certain acidic materials of the fruit are held in such fashion that they do not go into solution except upon pressing the pulp and upon going into solution during pressing react with the alkaline material reducing the pH. The optimum pH for the pulp is conveniently determined in a given case by test, as described hereinafter, and by the same test the amount of lime or other alkaline material which should be added to produce the desired pH may also be determined. Then, instead of adding the alkaline material to the pulp gradually and determining when the desired pH is reached by periodic checking, this predetermined amount of alkaline material may be added, avoiding the necessity for the periodic check. Either method is within the scope of the invention, however.

In order to produce a homogeneous mixture and avoid local high concentrations of alkaline material, with resulting discoloration, the mass of the pulp is preferably thoroughly agitated during and following the addition of the lime or other alkaline material. For a similar purpose the alkaline material and most or all of the water may be added together. Where the alkaline material is not thus highly diluted with water but is added, for example, as described hereinafter, in the form of a 6 per cent aqueous solution the amount of water added with the alkaline material need not be taken into account in determining how much other water to add since the quantity of 6 per cent lime solution which is ordinarily added to the pulped fruit is of the order of about one gallon per ton of water in the pulped fruit.

The alkaline material added to the pulp is preferably an alkaline defecating agent, that is, an alkaline material which can be readily eliminated from the liquid at a later stage of the process and which is also capable of precipitating undesired impurities. While other alkaline materials or other materials adapted to increase the pH and having the characteristics described in the preceding sentence may be used, the alkaline earth metal oxides and hydroxides, such as the oxides and hydroxides of barium, calcium, magnesium and strontium, and particularly lime, have been found to be especially suited, since they meet the various requirements set forth above very satisfactorily, and since these are preferred alkaline defecating agents to be added during the defecation of the extracted juice. In any case, the alkaline material is preferably dissolved or dispersed in water prior to adding it to the pulp.

An indicated above, either instead of or in addition to the alkaline material, a quantity of fibrous material may be added to the pulp to facilitate the juice extraction. If such fibrous material added is itself sugar-bearing, it not only serves to incorporate fibrous material in the pulp mixture but at the same time adds its quota of sugar to the extracted juice. Sugar-bearing fibrous material is, therefore, preferred, particularly from the fibrous material added is of the order of about 8 per cent to about 30 per cent, by weight, based on the weight of the pulp, but the quantity of fibrous material added may vary considerably above and below these amounts, if desired. Preferably, of course, the fibrous material used should not introduce any impurities which require special treatment for their removal. By way of illustration, it has been found that a sorghum, having a sugar content of about 17° Brix, when combined with fruit pulp makes a splendid pressing vehicle. Adding its quota of sugar to the extracted juice, it also improves for by-product purposes the pulp residue from the extraction step and has the further advantage of containing small but nevertheless appreciable amounts of phosphoric acid.

It has been found that when fibrous material is added to the pulp, even without the addition of alkali, the juice flows from the pulp quite readily when the pulp is suitably pressed. The presence of the fiber in the pulp mass apparently changes the nature or consistency of the mass sufficiently to permit the juice to flow out freely where it otherwise would not. While fibrous material without alkali will cause the juice to flow out of the pulp freely under pressure, the presence of alkaline material along with the fibrous material results in a still more efficient juice extraction and therefore the use of the two together is preferred. It appears that the alkaline material aids in breaking down the cell walls and increases the solubility of the desired sugars in the extraction liquid and that the fibrous material in the mass promotes the flow of the juice by serving as an excellent pressing vehicle. The added fibrous material not only facilitates juice extraction but also enhances the value of the pulp residue for by-product purposes, such as animal feed, fertilizer, et cetera, particularly where the fibrous material is sorghum, sugar-cane, sugar-beets, et cetera. The latter materials thus possess a double advantage since they also contribute their quota of sugar to the product.

This fibrous material is preferably ground or macerated prior to adding it to the fruit or fruit pulp since a much more powerful grinder is required for the fibrous material than is required for the fruit itself. The fruit and fibrous material may, however, be ground together in the same grinder. Where the fibrous material is ground separately it may be mixed after grinding with the fruit pulp or with the fruit itself so that it is present during the grinding of the latter and becomes thoroughly admixed therewith. It is within the scope of the invention, however, to bring the fibrous material and the fruit together either before or after the grinding of either or both. Particulaly in the case where the fruit and fibrous material are ground separately and then mixed, the resulting mass is preferably agitated prior to pressing in order to ensure thorough admixture of the fruit and fibre.

To further aid the pressing or filtering operations, the pulp mixture (including alkali and/or water, and/or fibrous material, when used) is preferably heated to a temperature not in excess of about 170° F. prior to the pressing or filtering. Higher temperatures tend to break down certain impurities, such as maltic and various other organic acids which may be present, and to give a permanent discoloration to the extracted juices. Very good results have been obtained with temperatures appreciably below 170° F.; for example, excellent pressing and extraction of sugar-bearing juices was obtained when the limed, watered, and thoroughly agitated pulp was heated to from about 150° F. to about 160° F. for about five minutes prior to pressing or filtering, and this was accomplished without bringing into the extracted juice various organic acids which were neutralized and precipitated as solids and left in the pulp, and without breaking down impurities and permanently discoloring the extracted juice. The time of heating may vary somewhat both above and below the five minutes mentioned above particularly with variations of heating temperature, being, in general, less as the heating temperature increases. The heating may be omitted, in fact, if desired although it has been found that best results are obtained if the heating is continued for at least five minutes at 150° F. to 160° F., which period represents a preferred minimum at these preferred temperatures so that longer heating times are not intended to be excluded from the scope of the invention.

The juice extracted from the pulp, as described above, still contains considerable quantities of impurities which are undesirable in the final product. Among these impurities may be certain organic acids which are rather difficult to precipitate. It has been found that to precipitate these organic acids with divalent alkaline material, such as lime or other alkaline earth metal oxides or hydroxides, it is necessary to increase the pH of the juice by addition of these alkaline materials to a pH in excess of the saccharating point which, as indicated above, is about ph 9. To this end the alkaline material is added until a pH within the range of about pH 10 to 11 is reached. If this is not done the organic acids referred to remain free in the finished juice and act as solvents for the decolorizing carbons with which the juice is treated. The preferred divalent alkaline material to be added at the point is lime but other divalent alkaline materials, both organic and inorganic, may be used.

After the pH has been so raised to within the range of about pH 10 to 11, a suitable acidic material, such as phosphoric acid, is added in sufficient quantity to reduce the pH to a point on the acid side where when the mixture is heated the impurities coagulate or flock and form a precipitate, usually applesauce-like, for easy separation from the sugar-bearing liquid by filtration or other means of separation. Such a pH usually is within the range of from about pH4.5 to 5.6. It has been observed that as a result of this treatment the fixed or difficultly-removable organic acids are precipitated out, together with the alkaline reagent added, and that a minimum of sugar is carried down in the form of sugar-containing calcium compounds or saccharates. The invention therefore contemplates such treatment, regardless of the exact mechanisms of the reactions.

Preferably, the pH of the juice is reduced to a pH of approximately 5.2 since at this pH the reaction of the juice with the phosphoric acid seems to have been completed. The juice is then heated to a temperature preferably in the range between about 76° C. and about 100° C. for a short period of time, whereupon a precipitate, usually applesauce-like, is formed which is very easily filtered and washed free of sugar juice or "sweetened off." The heating does not have to be continued for any extended period after the material has reached the desired temperature and the precipitate has formed since the object of this heating is to complete the reaction and throw down the desired readily filterable and usually applesauce-like precipitate. In washing this precipitate it is necessary to keep the pH of the wash water at about 5.2 or slightly more alkaline, in order to avoid redissolving of impurities thrown down in the precipitate. The water used to wash this precipitate is preferably returned for addition to another batch of pulp, as a leaching agent, and is the "sweet water" referred to above in this connection. This wash water may, however, if desired, be added to the sugar juice from which the precipitate is filtered. The preferred heating time decreases with increases in heating temperature and it will be understood that the preferred heating times given represent minimums so that somewhat longer heating times may be used without danger in order to insure completion of the reaction. The temperatures may also vary somewhat above and below the range given, although best results are obtained at the preferred temperatures. It has been found that in general the critical temperature at which a flocculent precipitate begins is about 73° C. Temperatures below 76° C. are thus contemplated.

The clear filtrate from the above filtration is brought to a point where when heated and filtered the filtrate shows the highest purity of dissolved sugar. The pH producing the highest purity filtrate is in the neighborhood of 7, and the clear filtrate from the acid filtration is preferably raised to approximately this pH by the addition of alkaline material of the type previously added to the juice. Upon bringing this neutralized filtrate to a boil and refiltering, all excess of lime or other divalent alkali used is eliminated. The precipitate from this filtration is also washed or "sweetened off" and the washings or "sweet water" is added to the filtrate or preferably combined with the "sweet water" from the first filtration and returned for addition to another batch of pulp as a leaching agent. The heating of the neutralized filtrate to boiling is preferred in order to insure maximum elimination of both impurities and added reagents but the boiling need not be continued for any substantial period of time.

In accordance with the preferred method as described above the alkaline material is added to the juice first and the acidic material later. However, due to the fact that a low pH is not objectionable during treatment the acidic material may be added prior to the addition of the alkaline material if desired. The addition of acidic material prior to the addition of the alkaline material is not preferred because more acidic material is required when it is added first and the preferred phosphoric acid is more expensive than the preferred alkaline material, lime. The addition of the alkaline material first is preferable not only to save acid but also for ease in control of the process.

The foregoing purification process eliminates the materials present in the fruit juice or added as reagents which detract from the sweetening power of the sugars present so that the final product is a sweetening medium. The principal materials which detract from the sweetening power, as pointed out above, are the acids and bitter salts, particularly the organic acids, and these are substantially eliminated by the process described. There are, of course, other non-sugars present in the original juice and a substantial portion of these is carried over into the final sweetening medium product as evidenced by the fact that the sugars purity of the products as indicated hereinafter is not usually 100 per cent. These non-sugars which remain cannot really be regarded as impurities, however, because they are inert and do not have any adverse effect on the sweetening power of the sugars present. Furthermore, they are constituents of the fruit from which the sweetening medium is derived and where the latter is to be added to fruit these non-sugars are the same as materials already present in the fruit. Some inert non-sugars may be eliminated during purification but such elimination is generally incidental to the main purpose.

The fruit juice from which the sweetening media are prepared contains also ingredients which give to the juice a characteristic flavor and taste and usually a color and in addition coloring materials are usually formed to a greater or lesser extent during the purification treatment. The materials imparting color, odor and flavor, particularly the latter two are not objectionable for certain purposes, for example, where the sweetening medium is to be used in fruit of the same type from which it is derived. The removal of these materials is not essential therefore, although it is preferred.

Some materials of this type are usually present in the clear filtrate from the filtration step last described above. Preferably, therefore, this clear filtrate is treated with animal bone char or any activated carbon whereby any coloring materials and any material imparting odor and flavor which may still be present is removed. The clear filtrate is ordinarily substantially neutral although its pH is usually not exactly 7. From the standpoint of the treatment with bone char or carbon it is better for the pH to be below 7, rather than above since both bone char and carbon work better at an acid pH than at an alkaline pH.

The clear filtrate may also be concentrated to any desired extent, but concentration preferably, but not necessarily, follows the treatment with bone char or carbon. Usually the concentration is not carried far enough to crystallize out any sugars since the syrup form of the sweetening medium is entirely satisfactory for most purposes and in fact is preferable. If a slightly caramelized color appears after concentration, the medium can be again decolorized over the bone char or activated carbon. Concentration is carried out in a conventional manner by evaporation accelerated by the use of heat. If desired, it may be continued to the point where the sugars are deposited out of the solution in crystalline form, although for many purposes this is not necessary or desirable as indicated above. For example, in making a sweetening medium for a fruit pack, the concentration may be omitted entirely or may be stopped after it has progressed to the point where a moderately thick syrup has been formed which is suitable for the packing of fruit.

In the above description phosphoric acid is given as an illustration of a suitable acid for reducing the pH of the juice from the range between about 10 to about 11 to that between about 5.6 and about 4.5. It is to be understood, however, that the invention is not limited to this preferred acid. Other acids having similar properties may be used instead. Thus, suitable acidic materials to use are acid defecating agents, that is any acid which, when added in sufficient quantity under the pH conditions specified, will prevent substantial quantities of sugar from being precipitated out of solution by the alkaline material, as, for example, by replacing the sugar in any insoluble compound formed with the sugar, and which acid does not introduce any undesirable radicals which require extra steps or extra care for their elimination or prevent any undesired organic acids from being precipitated out, as for example, by displacing the organic acids from precipitatable compounds they form with the alkaline material. Phosphoric acid is preferred because it gives consistently good results in eliminating impurities and does not give undesirable properties to the syrups such as bad taste. Other acids may be used for part or all of the acidification but are not preferred because of their inferiority in one respect or another to phosphoric acid. Thus, carbonic acid may be used to reduce the pH to about 9 but a drop in pH below this figure by the use of carbon dioxide, where lime is the alkali, redissolves calcium oxide and forms soluble bicarbonates of lime which are very difficult to eliminate and produce a very bad taste in the syrups. Acids, such as hydrochloric, acetic, and sulfuric, have been used but are not preferred, as is phosphoric acid, because of the consistently better results obtained with the latter acid.

The precipitates remaining from the two filtrations described above, that is, the one within the pH range from 4.5 to 5.6 and the one at about pH 7, have a very high fertilizer value. To put them into proper condition for this use they are neutralized with lime to whatever extent is necessary, and dried. The pulp remaining after the juice has been pressed out is also useful as fertilizer or for various other purposes, and may, for example, be used as a humus filler in fertilizer made from the precipitates.

It is an outstanding advantage of the present invention that it is so well adapted to the treatment of a wide variety of fruits, including particularly fruit wastes, alone or in admixtures of various fruits containing different amounts and kinds of sugars. The various ranges of conditions given in the above broad description will include the optimum conditions for any batch to be treated, however, and it is a further outstanding advantage of this invention that the optimum conditions for any given batch of fruit to be treated can be very readily determined by those skilled in the art by very simple tests. It will be understood, of course, that while it is preferable to treat any fruit in accordance with these optimum conditions, the invention is not limited thereto but instead contemplates broadly the processing of fruit in accordance with the broad description. As a practical matter, it has been found that a standard treatment in accordance with a set of preferred conditions may be applied to fruits generally, even though these conditions are not the optimum conditions for each of the various fruits treated since moderate variations from optimum conditions within the ranges specified do not seriously affect the results.

For example, in the treatment of the pulp with alkaline material, such as lime, prior to extraction of the juice, it has been found that on a number of batches of fruit material satisfactory results were obtained by adding a quantity of lime sufficient to give the pulp a pH slightly in excess of 9, preferably about 9.5. Upon the addition of this quantity of lime the juice flowed from the pulp readily during extraction, had a pH which was well below 9, and was not substantially darkened. While substantial loss due to saccharation is not encountered in such standard treatment since the pH of the extracted juice does not exceed about 9, there is always the danger that the juice may be given a color which is difficult to remove since this can occur even when the pH of the juice is well below 9. The more alkaline material added, the more danger there is of giving the juice a color which it will be difficult to remove. It is preferable, therefore, to put in only just enough alkaline material, such as lime, as is indicated by test to give the maximum extraction without substantial darkening of the juice even though it is within the scope of the invention to add somewhat greater or lesser amounts since addition of alkaline material aids the extraction even when the quantity used is not the optimum.

The desirability of tests is emphasized by the fact that different fruits or even the same fruits from different localities, as well as different mixtures of fruits, frequently have different optimum pH's at which maximum extraction is obtained without substantial darkening of the juice. Also, while the natural pH of many fruits is about 4, this natural pH may vary even between different lots of the same fruit, and with variations in natural pH the amount of alkaline material required will vary even if the optimum pH to be obtained is the same. The test to determine the maximum point is very simple. It is merely necessary to take a small portion of the fruit to be treated and grind it to a fine pulp, adding water if necessary. The pulp is then divided up into a number of small portions and alkaline material is added thereto in amounts increasing with successive portions sufficiently to give each succeeding portion a pH which is 0.5 higher than that of the preceding one. The various samples are then pressed to extract the juice and the pH of the sample which gives maximum extraction without substantial discoloration is the correct pH to which to adjust the pH of the main batch of pulp.

The first step in the treatment of the extracted juice is to raise the pH above the saccharating point (pH 9) in order to cause certain difficultly-removable organic acids to react with the divalent alkaline material used to increase the pH. The exact pH to which the juice is raised within the range of about pH 10 to 11 is not critical. At a pH above about 10 the undesired organic acids react and if the pH does not exceed about 11 the destruction of sugars and discoloration of the juice is not excessive. Preferably, the pH is raised substantially above 10, i. e., to about 10.7, since this ensures the removal of the undesired acids and at the same time, being below 11, does not cause excessive destruction of sugars. Actually, of course, even below pH 11 some destruction of glucose will occur, with resulting discoloration of the juice, although the levulose, the most desired constituent, is not attacked.

Since it is not necessary to maintain the high pH of about 10 to 11 for a long period to get rid of the organic acids, it is preferable to reduce the pH, by the addition of acid, promptly after raising it, as described above. In accordance with the preferred standard procedure for fruits generally, the pH is reduced to about 5.2, preferably with phosphoric acid. The optimum pH to which to reduce the juice may be readily determined by adding to a sample of the juice a sufficient quantity of the alkaline material to raise the pH to about 10.7, then dividing the sample into several portions and reducing the pH of the different portions to pH's within the range from about pH 4.5 to pH 5.6, the various portions differing in pH by about .5. When the various portions are heated to about 76° C., it will be seen that at a certain pH the color and clarity are best and the maximum of impurities is eliminated.

In a manner similar to that described above, the optimum conditions within any of the ranges specified can be determined with respect to a particular lot of fruit, although, as pointed out, this is generally unnecessary. By way of further illustration, however, a sample of the extracted juice may be treated with alkaline material, for example, lime, to raise the pH to about 10.7, and thereafter acidified with phosphoric acid to pH 5.2 and filtered after heating to about 76° C. The filtrate is then divided into a number of portions, to successive ones of which the alkaline material used (in this case, lime) is added in such amounts as to give pH's increasing progressively by 0.5 up to neutrality or slightly above. Each portion is then brought to a boil and filtered. The pH of the one of these portions which is free of lime and of maximum purity and clarity is the optimum final pH for the juice in question.

In order to better illustrate the invention, a flow diagram is shown in the accompanying drawings. The flow diagram is that of a layout for treating sugar-bearing material according to one embodiment of the present invention. It will be understood that it is given merely by way of illustration and that the invention is not to be construed as limited thereto.

Fruit or fruit waste, ground to a fine pulp, is introduced into the mixing chamber 10 through a hopper 12. The mixing chamber 10 is provided with a valved lime water supply line 14, a valved "sweet water" supply line 16, and a valved line 18 through which plain water may be introduced. In this mixing chamber "sweet water," supplemented if necessary by plain water, is added in sufficient quantity to insure sugar extraction, as described above usually about 10% of the weight of the fine pulp, and the pulp is limed to a suitable pH, in the neighborhood of 9, which will crack the pulp without causing the pH of the expressed juice to run above 9, it being usually well below 9. The mixture of materials flows from the mixing chamber 10 to a mill 20 in which it is thoroughly agitated to form a homogeneous mixture and reduce the pulp to the fine state best adapted for pressing. From the mill 20 the thoroughly mixed mass of limed and watered pulp passes to a scroll heater 22 in which its temperature is raised to in the neighborhood of 150° F. and maintained at that temperature for about five minutes, preferably. It then passes to a filter press 24. In the filter press 24 the sugar juice is separated from the pulp which remains behind as a filter cake and is removed for disposition as fertilizer material or for other uses for which it is suited. Prior to removing the pulp from the filter press 24, it is washed or "sweetened off'" with water supplied through line 23. This washing is continued until the wash water coming through contains less than about 2% sugars.

The expressed juice, including the wash water, flows from the filter press 24 through valved lines 26 into three defecator tanks 28. Each of the defecator tanks 28, in addition to the supply lines 26, is provided with a valved acid supply line 30 and a valved lime water supply line 32. The acid supply lines 30 are connected through pipe 34 to an acid storage tank 36 containing a 6 per cent aqueous solution of phosphoric acid. In like manner the lime supply lines 32 are connected through a pipe 38 to a lime storage tank 40 containing a 6% aqueous solution of lime. The 6% solutions of both lime and acid are preferred since they give a good distribution of the reagents through the treated material and do not at the same time involve the introduction of excessive quantities of water along with the desired reagents. Both more concentrated or more dilute solutions may, however, be used if desired, so long as the pH of the treated material is controlled as described above. Preferably the lime and the acid reagent solutions will have concentrations which do not materially exceed 10% in order to avoid local high concentrations of reagent. Although the concentrations of the solutions of alkali and acid have been discussed together and with particular reference to lime and phosphoric acid, it will be understood that in any given batch it is by no means essential that the lime and acid solutions be of the same or even approximately the same strength. Furthermore, the above discussion of concentrations which particularly refers to lime and phosphoric acid is intended to be representative with respect to other alkalis and acids. Appropriate concentrations of other acids and alkalis will be readily apparent to those skilled in the art or can be readily determined by a simple test.

In the defecator tanks 28 the raw sugar juice is first treated with lime supplied through lines 32 to raise the pH of the juice to a pH in the range between about 10 and about 11, as described above. Suitable agitation is provided in each of these tanks to insure thorough mixing of the juice with added materials. After the pH has been raised to the desired point, the phosphoric acid solution is then run into each of the tanks 28 through the lines 30 until the pH is reduced to a pH in the range between about 5.6 and about 4.5, preferably about 5.2 or to the pH determined by test to give best results. Thorough agitation of the material in the defecator tanks 28 assures uniform distribution of phosphoric acid throughout the mass.

After the addition and thorough mixing in of the phosphoric acid, the material in the defecator tanks 28 is heated up to a temperature of about 76° C. to about 100° C., preferably about 80° C., suitable heating means (not shown) being associated with each of the defecator tanks 28. Upon heating the material in the defecator tanks 28 in this manner an applesauce-like precipitate separates out, as described above. The liquid and solid material in the tanks 28 is then drawn off through the valved lines 42 and passed into another filter press 44. The clear filtrate from the press 44 passes through the valved line 46 into valved lines 48. The filter cake remaining in the press 44 is then washed to remove any small amount of sugary liquid remaining therein. Wash water, preferably maintained at a pH of about 5.2 or slightly more, is introduced through the valved line 50 into the press 44.

As indicated above, the pH is maintained at the point specified to avoid redissolving undesirable impurities from the cake during the washing. The wash water, after passing through the filter cake, is drawn off through the valved line 52 from which it is returned through the line 54 to the "sweet water" supply line 16 leading into the mixing chamber 10 or it may be sent through lines 46 and 48 and added to the clear filtrate. Washing is preferably continued until the wash water leaving the press 44 contains less than about 1% sugars. The thoroughly washed cake is removed from the press 44 and neutralized, after which it is disposed of for fertilizer or other uses to which it is suited.

As may be seen, the valved lines 48 direct the filtrate from the press 44 into the two neutralizing tanks 56. The lime storage tank 40 is connected through the line 38, the line 58, and the valved line 60, to neutralizing tanks 56. Lime water from the storage tank 40 is run into the tanks 56 through the line 60 until the pH of the liquid in the tanks 56 is substantially 7 or such other substantially neutral pH as indicated by test to give best results on the batch undergoing treatment. Thorough agitation of the contents of the tanks 56 is provided to give a homogeneous mixture. This neutralization precipitates any excess of lime which may be present.

The liquid and solid material in the neutralizing tanks 56 is then heated to boiling by heating means (not shown) associated with neutralizing tanks 56 and is then drawn off through the valved lines 62 and passed into filter press 64. The filter cake in press 64 is washed by wash water admitted through line 63 in a manner similar to that described for the other filter cake in press 44. The washing is continued until the wash water coming from press 64 contains less than about 1% sugars. The washings may be added to the clear filtrate or they may be returned through lines 65 and 54 to the "sweet water" supply line 16. The clear liquid leaving the filter press 64 is now substantially free from impurities and when decolorized and/or concentrated, if necessary, is ready for use as a packing medium for fruits or for other purposes for which sugar syrups are suited. If it contains a substantial quantity of coloring matter or of matter imparting a characteristic odor or flavor, it is preferably drawn off through the valved line 66 into the charcoal filter 68. After it leaves the charcoal filter 68, if it is not to be concentrated it may be drawn off through the valved line 70 and sent to the cannery or to storage. When it is to be concentrated it is passed through valved line 72 into the evaporator 78 where a portion of the water content is eliminated.

The clear liquid from the press 64, with or without the washings, instead of being first filtered in the filter 68, may, if desired, be passed directly to the evaporator 74 through the valved line 76. This is sometimes desirable, particularly if the liquid leaving the press 64 contains very little color or if it is likely to acquire color during the evaporation step. Due to the fact that the liquid may acquire color in the evaporator or may not have been decolorized prior to evaporation, a second charcoal filter 78 is provided, through which the concentrated liquid from evaporator 74 may be passed by valved line 80. The valved line 81 is provided so that concentrated liquid from the evaporator 74 may be passed directly to the cannery for use or to storage instead of passing through the charcoal filter 78. The decolorized liquid leaving charcoal filter 78 may pass either of two ways, going to the cannery through the valved line 82, or to the storage tank 84 through the valved line 86.

The above flow diagram leads to the production of a sweetening medium in the form of a syrup and does not include any steps for recovering sugar in crystalline form. The evaporation may, however, as pointed out above, be continued in appropriate apparatus until pure crystalline sugar is obtained. This treatment is conventional, however, and need not be described in detail.

The above layout is for a process in which water and alkali alone are relied upon to facilitate the separation of the sugar from the pulp with which it is found associated. As pointed out above, instead of or along with the alkali, fibrous material may be added to the pulp, particularly sugar-bearing fibrous material, to facilitate the separation of the sugary liquid from the pulp. The flow diagram for such a process would be substantially the same as that shown in the accompanying drawing, the difference being that the materials charged to the mixing chamber 10 would include the fibrous material and might or might not include alkali or lime, as desired.

To further facilitate understanding of the improved sugar extraction method disclosed herein, the following detailed examples are given in which the parts are parts by weight unless otherwise indicated. These examples are to be construed as merely illustrative and not as limiting the scope of the invention.

*Example I*

In this example 600 pounds of pears were treated. These pears were found, on analysis of a sample of expressed juice, to contain 9% sugars or approximately 54 pounds, and the sugars in the expressed juice were found to have a purity of about 56.6% or, in other words, 56.6% of the total solids dissolved in the juice was sugars. Approximately 60 pounds of water were added to the 600 pounds of pears, and the pears were then ground to a fine, juicy pulp. Lime, in the form of a 6% aqueous solution or suspension, was then added, the mixture being simultaneously agitated until the pH of the pulp was increased to 9.6. The limed and watered mixture was then heated to 160° F. and maintained at this temperature for about five minutes. The mass showed cracking and evidence of the juice freeing itself from the mass in a clear break. Following the heating the mixture was transferred to a filter press and a sugar-bearing juice was readily pressed out. To avoid loss of sugars in the pulp, the filter cake remaining after the pressing was agitated and washed with water or "sweetened off" until the wash water contained less than approximately 2% sugars. This wash water or "sweet water" was added to the filtrate or juice.

The filtrate or expressed juice, after the addition of the wash water, was found to have a pH of about 7.7. In order to eliminate certain difficultly-removable impurities, additional quantities of the 6% lime solution were added to this juice until the pH was increased to 10.7. The juice was then acidified with a 10% aqueous solution of phosphoric acid until the pH of the juice was reduced to 4.7, which had been found to be the optimum acid pH, as indicated by previous tests, described above. Upon heating this mixture to 180° F. (82.2 C.) for a short period of time, an applesauce-like precipitate formed which was very easily filtered out in a filter press. The precipitate remaining in the filter press after filtration was "sweetened off" or washed with water until the wash water coming through did not contain more than about 1% sugars. The washings or "sweet water" was again added to the filtrate, and the filtrate was limed to a pH of 6.7, heated to 212° F. or boiling, and the mixture filtered in a filter press. The precipitate was washed to 1% sugars, and the wash water added to the filtrate, after which the filtrate was decolorized over bone char in the conventional manner to provide a sweetening medium in the form of a syrup which could be further concentrated to obtain sugar in crystalline form or used as such for various purposes, such as the packing of pears or other fruits.

Analysis of the final syrup product disclosed that it contained about 12.65% of dissolved solids, including about 9.37% sugars, so that it had a sugars purity of 74.1%. The 9.37% sugars consisted of 7.9% invert sugar and 1.47% sucrose. This sugars purity compares very favorably with that of the juice of water packed pears. Analysis of such a juice indicated that it contained 9.1% total solids, of which 6.36% was sugars, so that it had a sugars purity of 69.9%, the sugars including .97% sucrose and 5.39% invert sugars. Not only is the resulting syrup of very high purity but, in addition, the efficiency of the sugar extraction is excellent. Six hundred pounds of pears originally contained 9% sugars, as indicated above or, in other words, 54 pounds of sugar having a purity of 56.6%. From this 600 pounds of pears 51 pounds of the sugar were recovered in the syrup, which, as indicated, had a purity of 74.1%. The sugar extracted by the process is thus 94% of the total present in the original pears. Furthermore, the product was substantially free of acids and had no bitter taste whatever, such as results from salts or ash-forming materials when present in substantial amounts. It was a sweetening medium capable of definitely increasing the sweetness of materials to which it was added to as great, if not a greater, extent than a sucrose syrup of the same Brix.

*Example II*

In this example 900 pounds of raisins were treated. These raisins were found on analysis of a sample of expressed juice to contain 60% sugars of 76% sugars purity (that is, 76% of the total solids dissolved in the expressed juice was sugars). Approximately 2700 pounds of water were added to the 900 pounds of raisins, and the raisins were then ground to a fine pulp. Lime, in the form of a 6% aqueous solution or suspension, was then added, the mixture being simultaneously agitated until the pH of the pulp was increased to 9.6. The limed and watered mixture was then heated to 160° F., at which temperature it was maintained for about five minutes. The mass showed cracking and evidence of the juice freeing itself from the mass in a clear break. Following the heating the mixture was transferred to a filter press and a sugar-bearing juice was readily pressed out. To avoid loss of sugars in the pulp, the filter cake remaining after the pressing was agitated and washed with water or "sweetened off" until the wash water contained less than approximately 2% sugars. This wash water or "sweet water" was added to the filtrate or juice.

The filtrate after the addition of the wash water was found to have a pH of about 7.7. In order to eliminate certain difficultly-removable impurities, additional quantities of the 6% lime solution were added to this juice until the pH was increased to 10.7. The juice was then acidified with a 10% aqueous solution of phosphoric acid until the pH of the juice was reduced to 4.7, which had been found to be the optimum acid pH, as indicated by previous tests described above. Upon heating this mixture to 180° F. for a short period of time, an applesauce-like precipitate formed which was very easily filtered out in a filter press. This precipitate was "sweetened off" or washed with water to 1% sugars, the wash water being added to the filtrate. Thereafter the filtrate was limed to a pH of 6.7, heated to 212° F. or boiling, and the mixture filtered in a filter press. After the addition to the filtrate of the wash water obtained by washing the precipitate to 1% sugars, the filtrate was decolorized over bone char in the conventional manner to provide a sweetening medium in the form of a syrup which could be further concentrated to obtain sugar in crystalline form or used as such for various purposes such as the packing of fruits.

The syrup product so obtained was found on analysis to have a sugars purity of 94.1%. Moreover, of the original 540 pounds of sugar (60% of 900 pounds) contained in the raisins treated, 528 pounds were recovered in the syrup product which have a sugars purity of 94.1% as compared with 76% for unpurified juice expressed from the raisins. It will be noted that 97% of the sugars present in the raisins was recovered. The product was substantially free of acids and of bitter tasting salts so that it had very excellent sweetening properties and was capable of sweetening materials to which it was added to an even greater extent than a sucrose syrup of the same Brix.

The advantages of the improved process described herein will be to a large extent apparent from the foregoing description. An outstanding advantage of the method which forms the subject matter of this application is that it provides for the first time a practical and commercially feasible process for preparing a real sweetening medium from fruit whole or waste and for isolating in a useful form substantially all the sugars naturally occurring in fruit. The sugars present in the sweetening media described herein have substantially the same composition as those naturally occurring in fruit and are to a very large extent monosaccharides and the advantages of such sugars over sucrose are well known. Furthermore, the pulp remaining after extraction of the sugar-bearing juice is left in a condition where it is highly useful for a variety of purposes, such, for example, as fertilizer. These results are obtained because the process provides better separation of the juice, high percentage recovery of the sugars in the fruit and ease of filtration of the various mixtures of liquids and solids requiring separation and is at the same time simple to carry out.

Furthermore, the sweetening medium which is obtained is in a condition where it is ready for use without further treatment, for example, in the packing of fruit, which may or may not be the same as the fruit from which the sweetening medium was derived. Use of the sweetening syrup with fruit other than that from which it was derived is entirely feasible because the individual flavors and individual coloring matters of the fruits from which the syrup is prepared are practically eliminated. It will be clear that fruit packed with these syrups has definite advantages as a food due to the fact that the sweetening syrup in which the fruit is packed does not contain any material not found in the fruit itself.

It is apparent that many widely different embodiments of this invention may be made without departing from the spirit and scope thereof, and therefore it is not intended to be limited except as indicated in the appended claims.

The invention is hereby claimed as follows:

1. The process of preparing a sweetening medium from fruit which comprises adding to a juice extracted from fruit and comprising the sweetening ingredients of the fruit a quantity of dilute aqueous lime sufficient to increase the pH of the juice to a pH well within the range from about pH 10 to about pH 11, then adding a dilute aqueous solution of phosphoric acid in an amount sufficient to reduce the pH to substantially the pH within the range from about pH 4.5 to about pH 5.6, at which a maximum of impurities is precipitated, heating the mixture at this pH to a temperature in the range from about 76° C. to about 100° C. for a short time to complete the formation of the precipitate, then separating the precipitate so formed to leave a clear liquid, adding more lime to this clear liquid to increase the pH to substantially the pH where a maximum of impurities is precipitated from it, heating the mixture at this pH to a boil to complete the formation of the precipitate, and then separating the precipitate so formed to leave a clear liquid, and finally treating the clear liquid with decolorizing carbon.

2. In the process of preparing a sweetening medium from fruit the steps which comprise adding water to the fruit in a quantity sufficient for complete extraction of the sweetening ingredients of the fruit, grinding it to a pulp, adding to the pulp-water mixture a quantity of dilute aqueous lime sufficient to bring about a substantially maximum extraction of the sweetening ingredients of the fruit but insufficient to give the extracted juice a pH in excess of about pH 9, heating the limed pulp mixture to an elevated temperature below about 170° F. for a substantial period of time sufficient to crack the pulp, pressing the heated pulp mixture to extract therefrom a sugar bearing juice, adding to the extracted juice a quantity of dilute aqueous lime sufficient to increase the pH of the juice to a pH in the range from about pH 10 to about pH 11, then adding dilute aqueous phosphoric acid in an amount sufficient to reduce the pH to a pH within the range from about pH 4.5 to about pH 5.6, heating the mixture at this pH to a temperature in the range from about 76° C. to about 100° C. for a short time to complete the formation of the precipitate, then separating the precipitate so formed to leave a clear liquid, adding more lime to this clear liquid to increase the pH to substantially the pH where a maximum of impurities is precipitated from it, heating the mixture at this pH to substantially a boil to complete the formaton of the precipitate and separating the precipitate so formed to leave a clear liquid.

3. In the process of preparing a sweetening medium from fruit, the steps which comprise adding water to the fruit in a quantity sufficient for complete extraction of the sweetening ingredients of the fruit, grinding it to a pulp, adding to the pulp-water mixture a quantity of ground sorghum equal to about 8% to about 30%, by weight, based on the weight of the fruit, heating the pulp mixture to an elevated temperature below about 170° F. for a substantial period of time sufficient to crack the pulp, pressing the heated pulp mixture to extract therefrom a sugar-bearing juice, adding to the extracted juice a quantity of dilute aqueous lime sufficient to increase the pH of the juice to a pH in the range from about pH 10 to about pH 11, then adding dilute aqueous phosphoric acid in an amount sufficient to reduce the pH to a pH within the range from about pH 4.5 to about pH 5.6, heating the mixture at this pH to a temperature in the range from about 76° C. to about 100° C. for a short time to complete the formation of the precipitate, then separating the precipitate so formed to leave a clear liquid, adding more lime to this clear liquid to increase the pH to substantially the pH where a maximum of impurities is precipitated from it, heating the mixture at this pH to substantially a boil to complete the formation of the precipitate, and separating the precipitate so formed to leave a clear liquid.

4. In the process of preparing a sweetening medium from fruit, the steps which comprise adding to a juice extracted from fruit and comprising the sweetening ingredients of the fruit a quantity of an alkaline defecating agent sufficient to increase the pH of the juice to a pH in the range from about pH 10 to about pH 11, then adding an acid defecating agent in an amount sufficient to precipitate undesired impurities in the form of an easily filterable and washable precipitate and reduce the pH to a pH within the range from about pH 4 to about pH 6, and then separating the precipitate so formed to leave a clear liquid.

5. In the process of preparing a sweetening medium from fruit, the steps which comprise adding to a juice extracted from fruit and comprising the sweetening ingredients of the fruit a quantity of an alkaline defecating agent sufficient to increase the pH of the juice to a pH in the range from about pH 10 to about pH 11, then adding phosphoric acid in an amount sufficient to precipitate undesired impurities in the form of an easily filterable and washable precipitate and reduce the pH to a pH within the range from about pH 4 to about pH 6, and then separating the precipitate so formed to leave a clear liquid.

6. In the process of preparing a sweetening medium from fruit, the steps which comprise adding to a juice extracted from fruit and comprising the sweetening ingredients of the fruit a quantity of an alkaline defecating agent sufficient to increase the pH of the juice to a pH in the range from about pH 10 to about pH 11, then adding phosphoric acid in an amount sufficient to precipitate undesired impurities in the form of an easily filterable and washable precipitate and reduce the pH to a pH within the range from about pH 4 to about pH 6, then separating the precipitate so formed to leave a clear liquid, and thereafter increasing the pH of the clear liquid with additional quantities of said alkaline material to a pH where still further quantities of impurities are precipitated, and then separating the precipitate so formed to leave a clear liquid.

7. In the process of preparing a sweetening medium from fruit, the steps which comprise extracting from the fruit a juice comprising the sweetening ingredients of the fruit by pressing the fruit in the form of a pulp in the presence of a quantity of an alkaline defecating agent sufficient to promote the extraction of the sweetening ingredients of the fruit but insufficient to give the extracted juice a pH in excess of about pH 9, adding to the extracted juice a quantity of an alkaline defecating agent sufficient to increase the pH of the juice to a pH in the range from about pH 10 to about pH 11, then adding an acid defecating agent in an amount sufficient to precipitate undesired impurities in the form of an easily filterable and washable precipitate and reduce the pH to a pH within the range from about pH 4 to about pH 6, and then separating the precipitate so formed to leave a clear liquid.

8. I the process of preparing a sweetening medium from fruit, the steps which comprise extracting from the fruit a juice comprising the sweetening ingredients of the fruit by pressing the fruit in the form of a pulp in the presence of added fibrous material which promotes the extraction of the sweetening ingredients, said fibrous material being present in an amount equal to about 8% to about 30%, by weight, based on the weight of the fruit, adding to the extracted juice a quantity of an alkaline defecating agent sufficient to increase the pH of the juice to a pH in the range from about pH 10 to about pH 11, then adding an acid defecating agent in an amount sufficient to precipitate undesired impurities in the form of an easily filterable and washable precipitate and reduce the pH to a pH within the range from about pH 4 to about pH 6, and then separating the precipitate so formed to leave a clear liquid.

ARVID M. ERICKSON.
JOHN D. RYAN.

REFERENCES CITED

The following references are of record in the file of this patent:

UNITED STATES PATENTS

| Number | Name | Date |
| --- | --- | --- |
| 718,692 | Breyer | Jan. 20, 1903 |
| 803,945 | Weinrich | Nov. 7, 1905 |
| 881,641 | Weinrich | Mar. 10, 1908 |
| 950,035 | Weinrich | Feb. 22, 1910 |
| 1,095,189 | Carniol | May 5, 1914 |
| 1,141,458 | Gore | June 1, 1915 |
| 1,166,674 | Gould | Jan. 4, 1916 |
| 1,362,870 | Johnson | Dec. 21, 1920 |
| 1,746,994 | Denny | Feb. 11, 1930 |
| 1,988,923 | Teatini | Jan. 22, 1935 |
| 2,016,584 | Ash | Oct. 8, 1935 |
| 2,221,683 | Smit | Nov. 12, 1940 |

FOREIGN PATENTS

| Number | Country | Date |
| --- | --- | --- |
| 465,852 | Great Britain | May 18, 1937 |

OTHER REFERENCES

Sorghum-Syrup Mfg. Farmer's Bulletin 477, U. S. Dept. of Agriculture, Feb. 1918, pages 18 and 19.

Bardoff and Ball, "The Elements of Sugar Refining," pages 5, 7, 58 and 59.

Certificate of Correction

Patent No. 2,482,750 September 27, 1949

ARVID M. ERICKSON ET AL.

It is hereby certified that errors appear in the printed specification of the above numbered patent requiring correction as follows:

Column 5, line 46, before the word "fibrous" insert *economic standpoint. Preferably, the amount of*; column 19, line 42, for "I the process" read *In the process*;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*